US012117772B2

(12) United States Patent
Balmer

(10) Patent No.: US 12,117,772 B2
(45) Date of Patent: Oct. 15, 2024

(54) MOTOR MODULE FOR A HOROLOGICAL MOVEMENT

(71) Applicant: ETA SA Manufacture Horlogère Suisse, Grenchen (CH)

(72) Inventor: Raphaël Balmer, Vicques (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 666 days.

(21) Appl. No.: 17/314,096

(22) Filed: May 7, 2021

(65) Prior Publication Data

US 2021/0389725 A1 Dec. 16, 2021

(30) Foreign Application Priority Data

Jun. 12, 2020 (EP) .................................... 20179601

(51) Int. Cl.

| | |
|---|---|
| ***G04B 15/14*** | (2006.01) |
| ***G04B 13/02*** | (2006.01) |
| ***G04B 29/02*** | (2006.01) |
| ***G04B 29/04*** | (2006.01) |

(52) U.S. Cl.

CPC ........... *G04B 15/14* (2013.01); *G04B 29/027* (2013.01); *G04B 29/04* (2013.01); *G04B 13/022* (2013.01)

(58) Field of Classification Search

CPC ...... G04B 15/14; G04B 29/027; G04B 29/04; G04B 13/022; G04G 17/02

See application file for complete search history.

(56) References Cited

U.S. PATENT DOCUMENTS

| | | | | |
|---|---|---|---|---|
| 8,619,504 | B2 * | 12/2013 | Wyssbrod | G04B 29/04 368/76 |
| 2005/0128884 | A1 * | 6/2005 | Endo | G04B 31/016 368/324 |
| 2017/0176945 | A1 * | 6/2017 | Lagorgette | G04C 3/00 |

FOREIGN PATENT DOCUMENTS

| | | | | |
|---|---|---|---|---|
| CH | 700 987 | A2 | 11/2010 | |
| CH | 713 547 | A2 | 9/2018 | |
| CN | 102540855 | A | 7/2012 | |
| CN | 202929358 | U | 5/2013 | |
| CN | 203232251 | U * | 10/2013 | G04B 29/027 |
| CN | 204241853 | U * | 4/2015 | G04G 17/02 |
| CN | 2042418523 | U | 4/2015 | |
| CN | 105319944 | A | 2/2016 | |
| GB | 2176319 | A * | 12/1986 | G04C 3/008 |
| JP | 51-113460 | U1 | 3/1975 | |
| JP | 5-69694 | U | 9/1993 | |
| JP | 7-20630 | | 5/1995 | |
| JP | 9-43365 | A | 2/1997 | |

(Continued)

OTHER PUBLICATIONS

Combined Chinese Office Action and Search Report Jul. 1, 2022 in Chinese Patent Application No. 202110659567.X (with English translation), citing documents 15 through 20 therein, 21.

(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A motor module for a horological movement, the motor module including a plate bearing one or more cogs, and a cog bridge mounted on the plate, wherein the cog bridge includes a device for clipping the cog bridge onto the plate.

8 Claims, 4 Drawing Sheets

(56) References Cited

FOREIGN PATENT DOCUMENTS

| | | |
|---|---|---|
| JP | 2017-146147 A | 8/2017 |
| TW | 201928545 A | 7/2019 |

OTHER PUBLICATIONS

Japanese Office Action issued May 17, 2022 in Japanese Patent Application No. 2021-085048 (with English translation), citing documents AO through AQ therein, 7 pages.
European Search Report issued Oct. 29, 2020 in European Application 20179601.8 filed on Jun. 12, 2020, citing documents AO-AP therein, 3 pages (with English Translation of Categories of Cited Documents).
Office Action issued Aug. 30, 2023, in corresponding Korean Patent Application No. 10-2021-0070955 (with English Translation), citing documents 15-17 therein, 14 pages.

* cited by examiner

MOTOR MODULE FOR A HOROLOGICAL MOVEMENT

CROSS-REFERENCE TO RELATED APPLICATION

This application claims priority to European Patent Application No. 20179601.8 filed on Jun. 12, 2020, the entire disclosure of which is hereby incorporated herein by reference.

TECHNICAL FIELD

The invention relates to a motor module for a horological movement. Such a motor module is intended in particular for driving the hands of a timepiece comprising the horological movement.

The invention also relates to a horological movement including such a motor module, as well as a timepiece including such a horological movement. The timepiece is for example a watch.

The invention also relates to a method of assembling such a motor module.

Technological Background

Modular timepieces are known. The latter are very common in electronic watchmaking, but less common in mechanical watchmaking, where the modular construction, generally designed to decline a same basic mechanical movement into several calibers with different functionalities or a different presentation, rarely proves to be less costly than traditional manufacturing. Only certain additional mechanisms, made on additional boards, are relatively common. One of the main modules of such a modular timepiece is the motor module. Such a motor module for a horological movement typically includes a plate bearing one or more cogs, and a cog bridge mounted on the plate. The cog bridge defines with the plate a space within which, in addition to the cogs, electromechanical elements are accommodated, such as for example rotors, stators or coils. The motor module can be mechanical and therefore self-winding. It may also be a quartz motor module.

During the assembly of the motor module, once the cogs are placed on the plate, it is known to use a spacer between the cog bridge and the plate. A bridging screw then fixes the plate onto the spacer. Such a solution based on a spacer is described for example in patent document CH 588 108 B5. However, this type of screw and spacer fixing has the disadvantage of being inflexible and does not allow the parts of the motor module to be disassembled easily and quickly. Such an operation of dissembling the parts may be necessary for maintenance to be carried out on the motor module.

Another known assembly solution consists of engaging the cog bridge on pivots mounted in the plate, with the aid of pins which project from an external face of the plate and which allow the alignment and centring of the cog bridge relative to the plate. The cog bridge is then pushed slightly onto the plate, so as to obtain an initial hold of the bridge. A thermal-riveting operation is then applied to the studs, which by heating the studs, allows them to be deformed and thus ensures that the cog bridge is fixed to the plate. However, one problem with this type of assembly of the motor module is that once the cog bridge is thermally riveted onto the plate, it is no longer possible to remove the parts of the motor module without tearing off the parts and causing mechanical damage to the module. Furthermore, another disadvantage of such an assembly is that the studs are not sufficient to ensure a good fit of the cog bridge on the plate. Consequently, the cog bridge is not properly fitted onto the plate and may come out of the stud guide, and some of the pivots may also become disengaged during the thermal riveting. The clearance between the cogs is then no longer ensured.

SUMMARY OF THE INVENTION

The aim of the invention is therefore to provide a motor for a horological movement, allowing the parts of the motor module to be disassembled and reassembled without causing parts to be torn off, while ensuring a sufficient clamping force of the cog bridge against the plate to ensure the clearance between the cogs.

To this end, the invention relates to a motor module for a horological movement, and which comprises the features mentioned in the independent claim 1.

Particular forms of the motor module are defined in the dependent claims 2 to 11.

The presence, on the cog bridge, of means for clipping the cog bridge onto the plate makes it possible for a user to easily disassemble and assemble the parts of the motor module, without tearing off or causing a mechanical deterioration of the latter. Furthermore, such clipping means exert a sufficient clamping force to allow the mechanical support of the cog bridge on the plate, and thus ensure the clearance between the cogs.

Advantageously, the cog bridge is made from a non-magnetic material. Such a non-magnetic material preferably has a high modulus of elasticity. This ensures an optimum clipping of the cog bridge onto the plate, and guarantees an optimised clamping force between these two parts.

For this purpose, the invention also relates to a horological movement comprising the motor module described above, and which comprises the features mentioned in the dependent claim 12.

For this purpose, the invention also relates to a timepiece including the horological movement described above, and which comprises the features mentioned in the dependent claim 13.

For this purpose, the invention also relates to a method of assembling the motor module described above, and which comprises the features mentioned in the independent claim 14. The method of assembly according to the invention makes it possible to eliminate the thermal riveting, and thus to save at least one assembly operation in the method. This thus enables the operator placing the cogs to also clip the cog bridge onto the plate at the same workstation. Thus, the method according to the invention makes it possible to avoid moving the motor module to another welding or thermal riveting station, and thus eliminate the risk of disengaging certain pivots. The method according to the invention also makes it possible to save time during the assembly of the motor module.

BRIEF DESCRIPTION OF THE FIGURES

The aims, advantages and features of the motor module for the horological movement according to the invention are given in the following description on the basis of at least one non-limiting embodiment illustrated in the drawings, in which.

DETAILED DESCRIPTION OF THE INVENTION

In the following description reference is made to a horological movement provided with a motor module. The usual components of the horological movement, which are well known to a person skilled in the art in this technical field, are only described in a simplified manner or not described at all. The person skilled in the art would know how to adapt these different components and make them cooperate for the operation of the horological movement.

Figure 1:
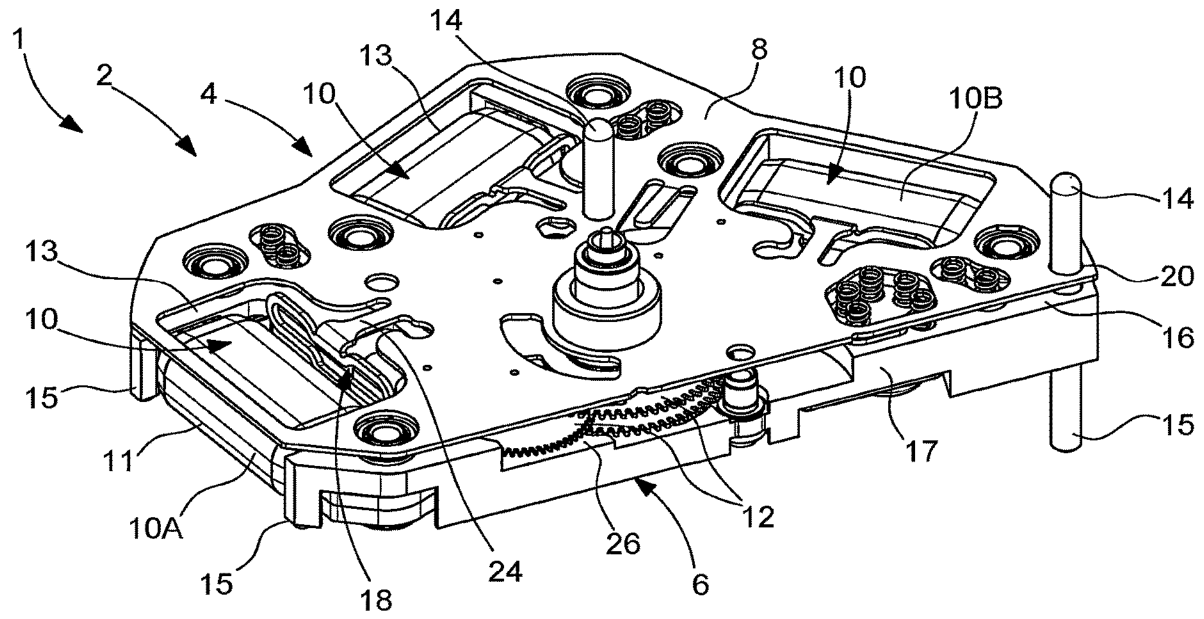
FIG. 1 is an exploded perspective view of a motor module for a horological movement according to a first embodiment of the invention, the motor module comprising a cog bridge provided with three clipping tabs.
Figure 2:
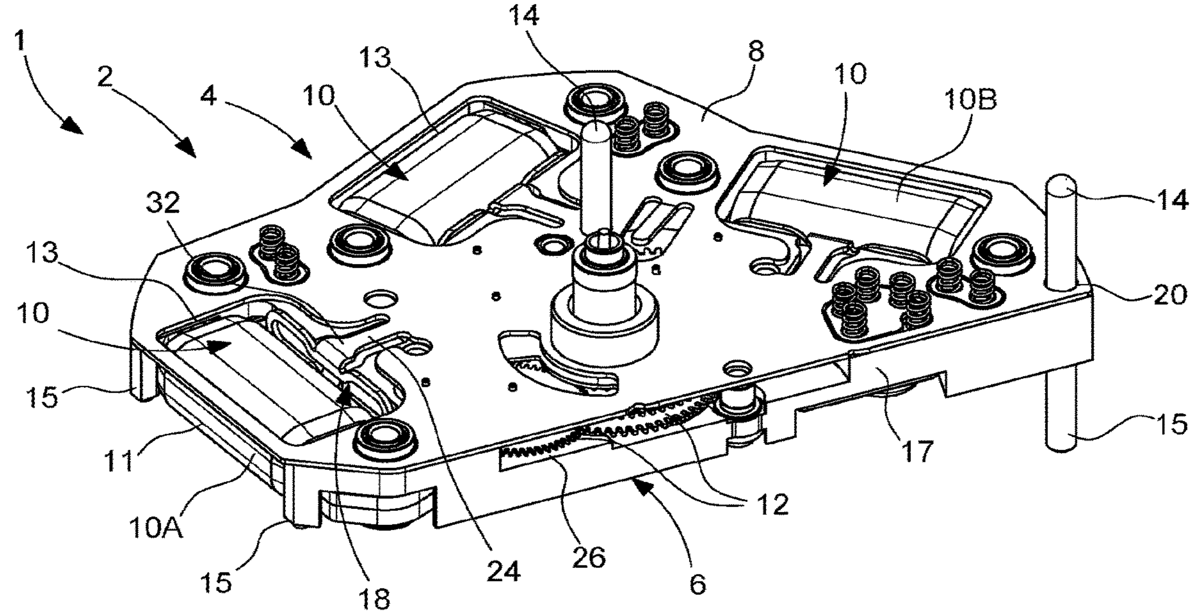
FIG. 2 is a perspective view of the module motor of FIG. 1, in an assembled configuration.

FIGS. 1 and 2 show part of a timepiece 1, which comprises a horological movement 2. The timepiece 1 is for example a mechanical watch or a quartz watch. The horological movement 2 includes a motor module 4, which is shown in FIGS. 1 to 4 according to a first embodiment of the invention. The motor module 4 is configured to be fixed, for example by screwing, adhesion or thermal riveting, to a printed circuit board (not shown) of the horological movement 2. The motor module 4 comprises a plate 6 and a cog bridge 8 mounted on the plate 6. The motor module 4 also comprises a plurality of electromechanical components 10, such as for example a stator 10A, a rotor (not shown in the Figures) and one or more coils 10B. In the particular embodiment illustrated in FIGS. 1 and 2, the electromechanical components 10A, 10B are arranged in housings 11 provided for this purpose underneath the cog bridge 8, such housings 11 being for example arranged within the plate 6. The electromechanical components 10A, 10B are thus mounted on the printed circuit board. Corresponding access openings 13 are formed for example in the cog bridge 8. Such openings 13 are arranged opposite the electromechanical components 10A, 10B in vertical direction. The openings 13 allow access to these components 10A, 10B from the exterior of the motor module 4 without having to disassemble the latter. Each opening 13 forms a recessed portion in the cog bridge 8. Preferably, the motor module 4 also comprises at least one pin 14 for pre-positioning the cog bridge 8 on the plate 6. In the particular embodiment shown in FIGS. 1 and 2, the plate 6 comprises two pre-positioning pins 14. Such pins 14 are used as a reference for mounting the cog bridge 8 on the plate 6.

The plate 6 bears a plurality of cogs 12. The plate 6 comprises for examples a plurality of support tabs 15 which raise a plate support 17 on which the cogs are mounted 12.

The cog bridge 8 has a substantially flat shape which defines a main extension plane P1. The cog bridge 8 comprises means 18 for clipping the cog bridge 8 onto the plate 6. Preferably, as shown in FIGS. 1 and 2, the cog bridge 8 also comprises at least one through hole 20 for receiving the pin. In the particular embodiment illustrated in FIGS. 1 and 2, the cog bridge 8 comprises two through holes 20 for receiving the pin. Each through hole 20 receives one of the pins 14. The cog bridge 8 is made for example from a non-magnetic material. The modulus of elasticity of the non-magnetic material typically has a value greater than or equal to 190 000 MPa. Preferably, the cog bridge 8 is made from a material selected from the group consisting of: a hardenable austenitic cobalt-chromium-nickel-based alloy, in particular an alloy known by the trade name PHYNOX©; a non-magnetic stainless steel, in particular a non-magnetic stainless steel known by the trade name SANDVIK 13RM19©; a non-magnetic copper-nickel-zinc-based alloy, in particular a non-magnetic alloy known by the trade name ARCAP©; and brass. The cog bridge 8 and the clipping means 18 are preferably formed by the same piece of material, and are manufactured for example by a stamping process (without this being limiting in the context of the present invention).

Preferably, the plate 6 includes complementary means 22 for cooperating with the clipping means 18. The complementary means 22 are configured to cooperate with the clipping means 18 to allow the cog bridge 8 to be locked onto the plate 6 in translation, particularly vertically. Preferably, the clipping means 18 comprise at least one clipping tab 24 which projects from a lower face 26 of the cog bridge 8. In the particular embodiment illustrated in FIGS. 1 and 2, the clipping means 18 comprises three clipping tabs 24. According to this particular embodiment, the complementary means 22 comprise three locking lugs 28. Each locking lug 28 projects from a lateral face 30 of the support plate 17 and is configured to cooperate resiliently with one of the clipping tabs 24.

Figure 3:
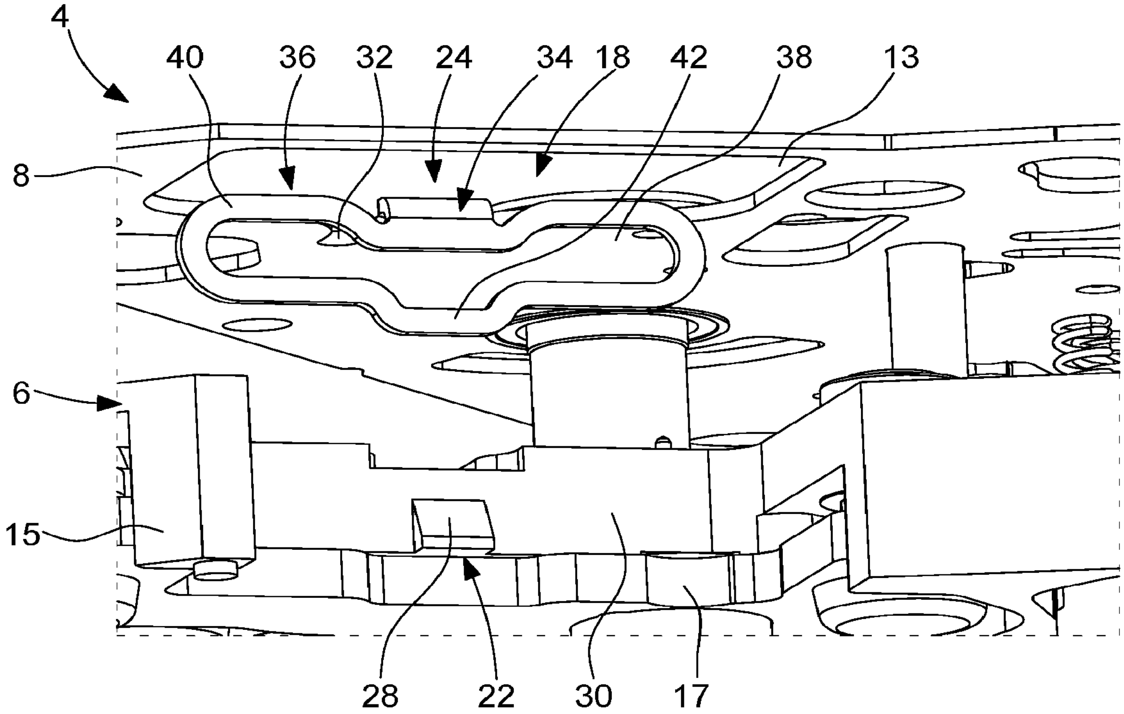
FIG. 3 is a perspective view of one of the clipping tabs of the motor module of FIG. 1, in the exploded configuration of the motor module.
Figure 4:
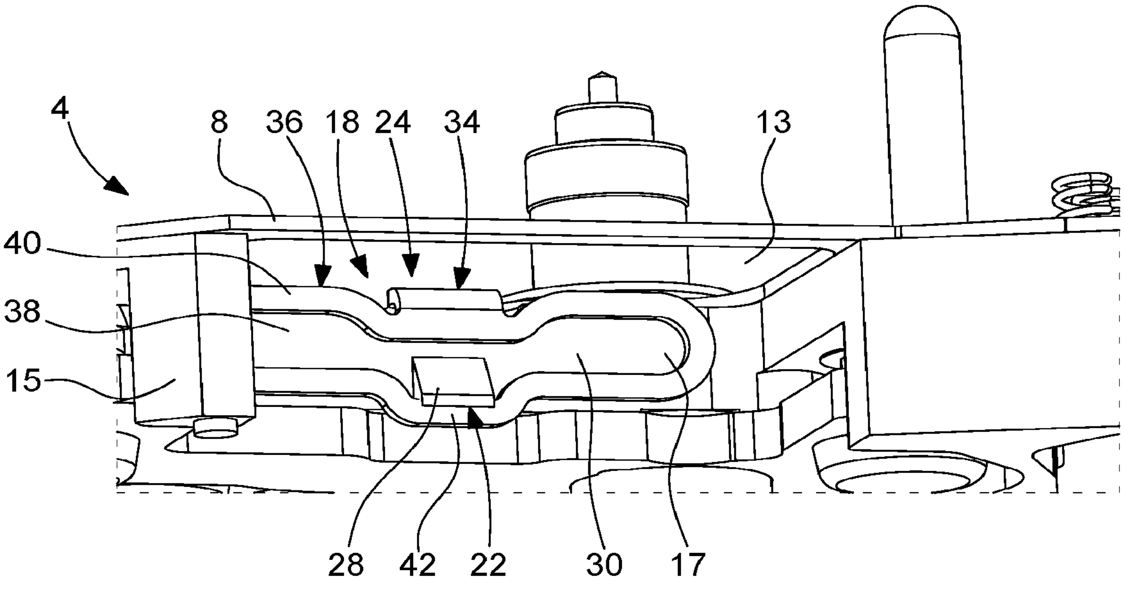
FIG. 4 is a similar view to that of FIG. 3, in the assembled configuration of the motor module represented in FIG. 2.

FIGS. 3 and 4 illustrate the cooperation between one of the clipping tabs 24 of the cog bridge 8 and one of the locking lugs 28 of the plate 6. More precisely, in the particular embodiment illustrated in these Figures, each clipping tab 24 is arranged in one of the recessed portions 13 of the cog bridge 8, and comprises a first part 32 and a second part 34. As shown in FIGS. 1 and 2, the first part 32 extends in the main extension plane P1 defined by the cog bridge 8 and forms a holding part of the tab 24. The second part 34 is integral with the material of the first part 32 and is folded in an inclined direction with respect to the main extension plane P1. More precisely, the second part 34 extends in a direction substantially perpendicular to the direction of extension of the first part 32, and is oriented downwards from the lower face 26 of the cog bridge 8.

The second part 34 of each clipping tab 24 has a free end 36. Preferably, as shown in FIGS. 1 to 4, the free end 36 of the second part 34 forms a resilient clipping member which has a recessed central portion 38 and a continuous closed periphery 40. The continuous closed periphery 40 delimits the recessed central portion 38. The continuous closed periphery 40 of the resilient clipping member 36 preferably has a resilient stressing part 42. As shown in FIG. 4, the resilient stressing part 42 is configured to cooperate resiliently with one of the locking lugs 28 when the lug 28 extends into the central recessed portion 38 of the free end 36. This cooperation between each locking lug 28 and each resilient stressing part 42 of a corresponding clipping tab 24 allows the cog bridge 8 to be locked onto the plate 6 in translation, in particular vertically.

The method of assembly of the motor module 4 according to the invention is described in the following. The cogs 12 and the electromechanical components 10 are initially placed in their respective locations and housings 11 within the plate 6. The method comprises a phase of mounting the cog bridge 8 on the plate 6. This mounting phase comprises for example an initial step of prepositioning the cog bridge 8 on the plate 6. To achieve this, the cog bridge 8 is guided on the prepositioning pins 14, by inserting the latter into the receiving holes 20 of the cog bridge 8. The mounting phase comprises a following step of clipping the cog bridge 8 onto the plate 6. To achieve this, in the particular embodiment represented in FIGS. 1 to 4, the free end 36 of each clipping tab 24 is brought up to the position shown in FIG. 4, so that the resiliently stressed part 42 cooperates resiliently with one of the lugs 28 of the plate 6 for locking the cog bridge 8 onto the plate 6 in translation, in particular vertically.

Figure 5:
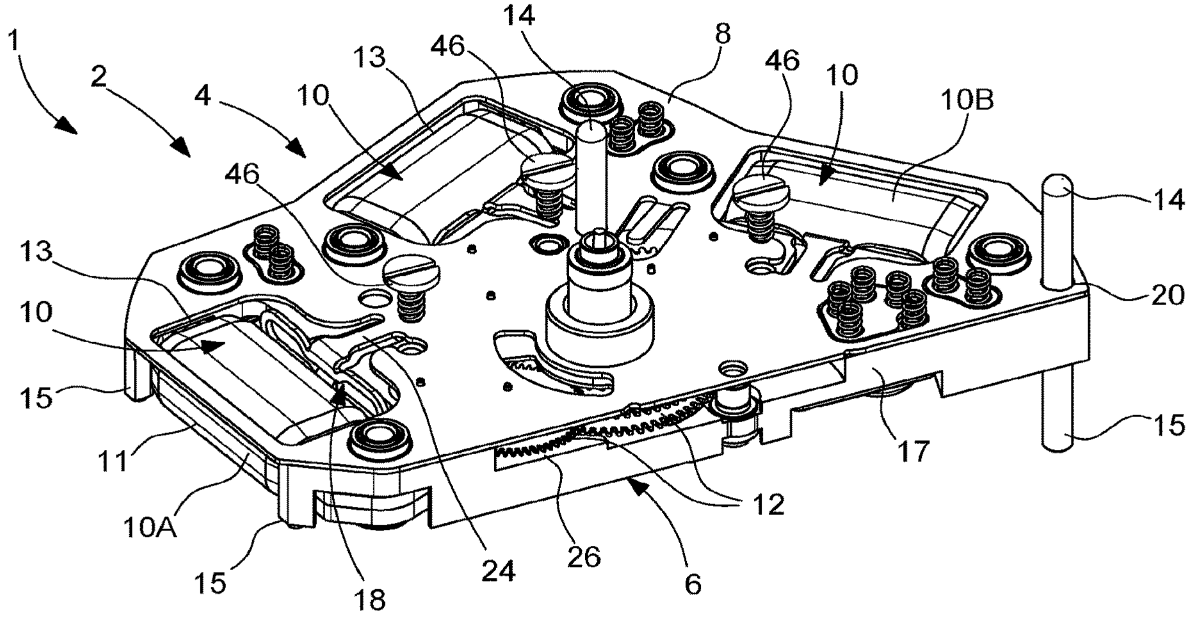
FIG. 5 is a perspective view of a motor module for a horological movement according to a second embodiment of the invention, in an assembled configuration.

The motor module 4 according to a second embodiment of the invention is now described with reference to FIG. 5. In this second embodiment of the invention, the elements described with the same numerical references as those in the first embodiment are identical to the latter and are therefore not described in detail again. In this second embodiment of the invention, the motor module 4 further comprises means 46 for vertically fixing the cog bridge 8 onto the plate 6. The vertical fixing means 46 are formed for example by one or more fixing screws, typically three fixing screws as in the example shown in FIG. 5.

The invention claimed is:

1. A motor module for a horological movement, the motor module comprising:

a plate bearing one or more cogs, and a cog bridge mounted on the plate, wherein the cog bridge comprises means for clipping the cog bridge onto the plate, wherein the clipping means comprise at least one clipping tab provided in a recessed portion of the cog bridge, wherein the at least one clipping tab comprises a first part for holding the tab extending in a main extension plane defined by the cog bridge, and a second part formed integrally with the first part and extending in a direction substantially perpendicular to the direction of extension of the first part such that the second part extends below a lower face of the cog bridge, wherein the second part includes an opening surrounded by a continuously closed periphery, wherein the plate is provided with complementary means for cooperating with the clipping means of the cog bridge to locking the cog bridge onto the plate in translation, and wherein the complementary means for cooperating with the clipping means comprise at least one locking lug projecting from a lateral face of the plate, said lug being configured to extend into the opening of the second part of the at least one clipping tab.

2. The motor module according to claim 1, wherein the at least one clipping tab includes three clipping tabs projecting from the lower face of the cog bridge.

3. The motor module according to claim 1, wherein the continuously closed periphery of the second part has a resilient stressing part configured to cooperate resiliently with the lug when the lug extends inside the opening, for locking the cog bridge onto the plate in translation.

4. The motor module according to claim 1, further comprising at least one pin for prepositioning the cog bridge on the plate; and wherein the cog bridge is provided with at least one through hole for receiving the pin.

5. The motor module according to claim 1, wherein the cog bridge is made from a non-magnetic material.

6. The motor module according to claim 1, wherein the cog bridge is made from a material selected from the group consisting of: a hardenable austenitic cobalt-chromium-nickel-based alloy, a non-magnetic stainless steel, a non-magnetic copper-nickel-zinc-based alloy, and brass.

7. The motor module according to claim 1, further comprising means for vertically fixing the cog bridge onto the plate, with one or more fixing screws.

8. A timepiece comprising the motor module according to claim 1.

* * * * *